(12) United States Patent
Copeland

(10) Patent No.: US 7,580,851 B1
(45) Date of Patent: Aug. 25, 2009

(54) SYSTEM AND METHOD FOR ESTIMATING DAILY SALES VOLUME

(75) Inventor: Kennon R. Copeland, Wayne, PA (US)

(73) Assignee: IMS Software Services Ltd., Plymouth Meeting ( * ) Notice: Subject to any disclaimer, the term of this patent is extended or adjusted under 35 U.S.C. 154(b) by 1683 days.

(21) Appl. No.: 09/714,387

(22) Filed: Nov. 16, 2000

(51) Int. Cl.
G06Q 90/00 (2006.01)

(52) U.S. Cl. ......................................................... 705/10
(58) Field of Classification Search ..................... 705/10
See application file for complete search history.

(56) References Cited

U.S. PATENT DOCUMENTS

| | | | | |
|---|---|---|---|---|
| 5,325,292 | A | * | 6/1994 | Crockett .......................... 705/9 |
| 5,420,786 | A | | 5/1995 | Felthauser et al. ........... 364/401 |
| 5,781,893 | A | | 7/1998 | Felthauser et al. ........... 705/210 |
| 6,021,394 | A | * | 2/2000 | Takahashi ..................... 705/10 |
| 6,032,125 | A | * | 2/2000 | Ando ........................... 705/10 |
| 6,609,101 | B1 | * | 8/2003 | Landvater ..................... 705/10 |
| 2001/0034637 | A1 | * | 10/2001 | Lin et al. ....................... 705/10 |

OTHER PUBLICATIONS

U.S. Appl. No. 60/180,379.*
Monczka et al, Supply Base Strategies to Maximize Supplier Performance, 1993, International Journal of Physical Distribution & Logistics Management v23n4, pp. 42-54. [Dialog File 15].*

* cited by examiner

Primary Examiner—Andre Boyce
(74) Attorney, Agent, or Firm—Baker Botts LLP

(57) ABSTRACT

A method of estimating daily sales volume includes calculating a day of the week specific projection factor based on reference sales history data in conjunction with an overlapping sample of current day of interest sales data. A sampling of sales data for a current day of interest is acquired and at least a portion of this data are scaled by the day of the week specific projection factor to determine an estimate of daily sales volume for the current day of interest. The portion of data which is used can be from the intersection of sources providing both reference sales history data and current day of interest data. The method provides for an accurate estimation of current daily sales based on a relatively small sampling of current day sales data. The method can be performed in a computer system coupled to a computer network for acquiring the sales data from a large number of retail points of sale.

14 Claims, 2 Drawing Sheets

US 7,580,851 B1

SYSTEM AND METHOD FOR ESTIMATING DAILY SALES VOLUME

FIELD OF THE INVENTION

The present invention relates generally to marketing of products and more particularly relates to systems and methods for estimating the daily sales of a product based on a sampling of sales data.

BACKGROUND OF THE INVENTION

Manufacturers and distributors of retail products generally monitor product sales in order to maintain proper inventory and to direct marketing efforts. While direct sales from the manufacturer or distributors provide certain useful information, data on ultimate sales to consumers are needed to fully plan inventory and marketing efforts. Monitoring of ultimate sales may be done by sampling sales at retail outlets and transferring sales data to a central point for evaluation. Retail outlets usually cooperate in providing sales data but a significant number of retail outlets are not able to or do not elect to have sales data sampled in a form needed for analysis. As a result, it is necessary to estimate product sales of unsampled individual outlets to provide marketing information.

Information on ultimate sales can be especially critical during certain market events—the launch of a new product into the marketplace, the withdrawal of a key product in the market, or the initiation of a major marketing campaign by one of the major competitors in the marketplace. These situations are certainly of major importance within the pharmaceutical industry. For example, in order to monitor the success of a new product release, or the effectiveness of promotional activity, it is desirable to determine sales volume on a daily basis. However, where the number of sales outlets is large and diverse, it is difficult to quickly gather sales data from all outlets to determine total daily sales volume on a timely basis.

Estimation of prescribing activity is carried out by marketing research practitioners based on ratio estimators and inflation factor estimators as commonly described in such texts as "Sampling Techniques" by W. G. Cochran, John Wiley, New York 1977. These methods attempt to estimate the activity in a pre-established geographic area of known dimensions by scaling up a sample of activity within the area in proportion to the level of a known auxiliary variable (i.e., ratio estimate) or in proportion to the level of sample coverage (via an inflation factor) for the entire area. Typical geographic areas are national or, in some few cases, regional. Such geographic-based methods must assume that the proportion of the total activity that is captured in the sample data (i.e., the captured proportion of the total prescription activity) is accurately represented by either the proportion of the known auxiliary variable captured by the sample data (when the ratio estimate method is applied) or the proportion of total outlets captured by the sample data (when the inflation factor method is applied).

In many cases sales estimates can be accurately projected based on historical data. The more stable the history, the more accurate such projections tend to be. In times of market flux, however, the underlying assumptions of the ratio estimation and inflation factor methods are likely violated and result in biased estimates of prescription activity.

It is known that data from a relatively small sample can be projected to estimate a total quantity by using a weighting factor. The quality of the estimation depends on the accuracy of the reported data, the representative nature of the sample to the total population and the appropriateness of the weighting factor.

A common approach to projecting data from a sample is to weight the sample data by either:

$$\frac{N}{n} = \frac{\text{total number of units in the population}}{\text{number of units in the sample}} \text{ or}$$

$$\frac{\sum_{i}^{N} Xi}{\sum_{i}^{n} Xi} = \frac{\text{total auxilliary size for units in the population}}{\text{auxilliary size for units in the sample}}$$

where Xi is some measure on the unit correlated with the variable which is of interest. For example, in the case of pharmaceutical sales data, the units generally refer to individual retail outlets (pharmacies) and Xi is typically the total purchase volume or total prescription volume for a pharmacy. However, a problem with such an approach is that the results can become highly variable when the number of units actually sampled is statistically small, resulting in a large projection factor, or potentially biased when the sample is not representative of the population or when there is little to no correlation between the measure of size, Xi, and the product of interest. This is very likely the case in times of market flux.

In the case of retail facilities, it is not uncommon for retail stores to report daily sales volume of a product in weekly batches which are delayed by several days or more. It is far more difficult, however, to obtain the cooperation of a large number of retailers to provide this data in "real time" at the close of business each day. Thus, when projecting estimates based on the large sample of delayed reporting, the data that are being used are somewhat stale and when basing projections on the real time data, the sampling pool tends to be relatively small. Each of these conditions can lead to inaccuracies in the resulting projection. Thus, there remains a need to provide improved systems and methods for estimating daily sales volume based on sampled data.

SUMMARY OF THE INVENTION

It is an object of the present invention to provide a method of estimating the daily sales volume of a product.

It is a further object of the present invention to provide a method of estimating the daily sales of a product based on a small current sampling.

It is another object of the present invention to provide a method of estimating the daily sales of a product based on a small current sampling of a days sales in conjunction with estimated sales history reference data.

It is yet another object of the present invention to provide a method of estimating the daily sales of a pharmaceutical based on a sampling of a days sales of the pharmaceutical from a small number of pharmacies in conjunction with estimated history reference data.

In accordance with the present invention, a first method for estimating daily sales volume includes calculating a day of the week specific projection factor based on reference sales history data in conjunction with an overlapping portion of a sampling of sales data for a current day of interest. A sampling of sales data for a current day of interest is acquired and that portion of the sampled sales data for the current day of interest that overlaps with the reference sales history data is scaled by the day of the week specific projection factor to determine an estimate of daily sales volume for the current day of interest.

Preferably, the reference sales history data include sampled sales data for the most recent available reference week prior to the day of interest. In this case, the step of calculating the day of the week specific projection factor can include generating daily estimated sales volume for at least one day in the reference week. It is also preferred that the portion of sampled sales data for the day of interest which is used is from those sources which have also provided data for the reference week.

Also in accordance with the present invention, a method for estimating the sales volume of an item includes collecting sampled sales data for a reference period and estimating total sales volume for the reference period. The data from the reference period are then parsed into a plurality of sub-periods. The method also includes collecting sampled sales data for a current sub-period of interest which is later in time than the reference period. A matching of the current sub-period to a corresponding sub-period from said plurality of sub-periods is performed and a sub-period specific projection factor for the corresponding sub-period is determined. By applying this projection factor to the sales data from the current sub-period of interest, an estimate of total sales for the current sub-period can be determined.

The sub-periods can be days of the week and the reference period can be one week. Preferably, the current sub-period is a certain day of the week, the sub-periods of the reference period are days of the week and the corresponding sub-period is the day of the week matching the certain day.

Generally, the sample size for the reference period is larger than the sample size for the current sub-period of interest.

A further method for estimating daily sales volume in accordance with the present invention includes collecting sampled sales data from a first plurality of sources for a current day of interest and collecting sampled sales data for a reference week from a second plurality of sources. The reference week is offset in time from the current day of interest by a predetermined time period. An estimate of total sales volume for the reference week is calculated and the sampled sales data and estimated total sales volume for the reference week are parsed by day of the week. Next, the sales data and estimated total sales volume data for the day of the week in the reference week that matches the day of the week of the current day of interest is selected from the parsed data. From at least a portion of the selected reference data, a day of the week specific projection factor for the current day of interest is calculated and applied to the sales data for the current day of interest to determine an estimate of total sales for the day of interest.

The method can include comparing the first plurality of sources to the second plurality of sources to determine the intersection of the sources and then use this intersection subset of the sources in determining the day of the week specific projection factor.

A system for estimating sales volume of an item in accordance with the present invention includes a computer processor with a communications interface for coupling the processor to a communications network to receive sales data from a number of retail points of sale. A data storage device is coupled to the processor for storing the sales data received from the retail points of sale, including sampled data for a reference period and sampled data for a day of interest which is later in time than the reference period. The processor operates under the control of a computer program which directs the processor to: retrieve the sampled data for the reference period from the data storage device; to generate estimated total volume data for the reference period from the sampled data for the reference period; to generate a day of the week specific projection factor related to the day of interest from the estimated total sales volume data and sampled data for the reference period; and to apply the projection factor to the sampled data for the day of interest to estimate total daily sales volume for the day of interest.

BRIEF DESCRIPTION OF THE DRAWING

Further objects, features and advantages of the invention will become apparent from the following detailed description taken in conjunction with the accompanying figures showing illustrative embodiments of the invention, in which.

Figure 1:
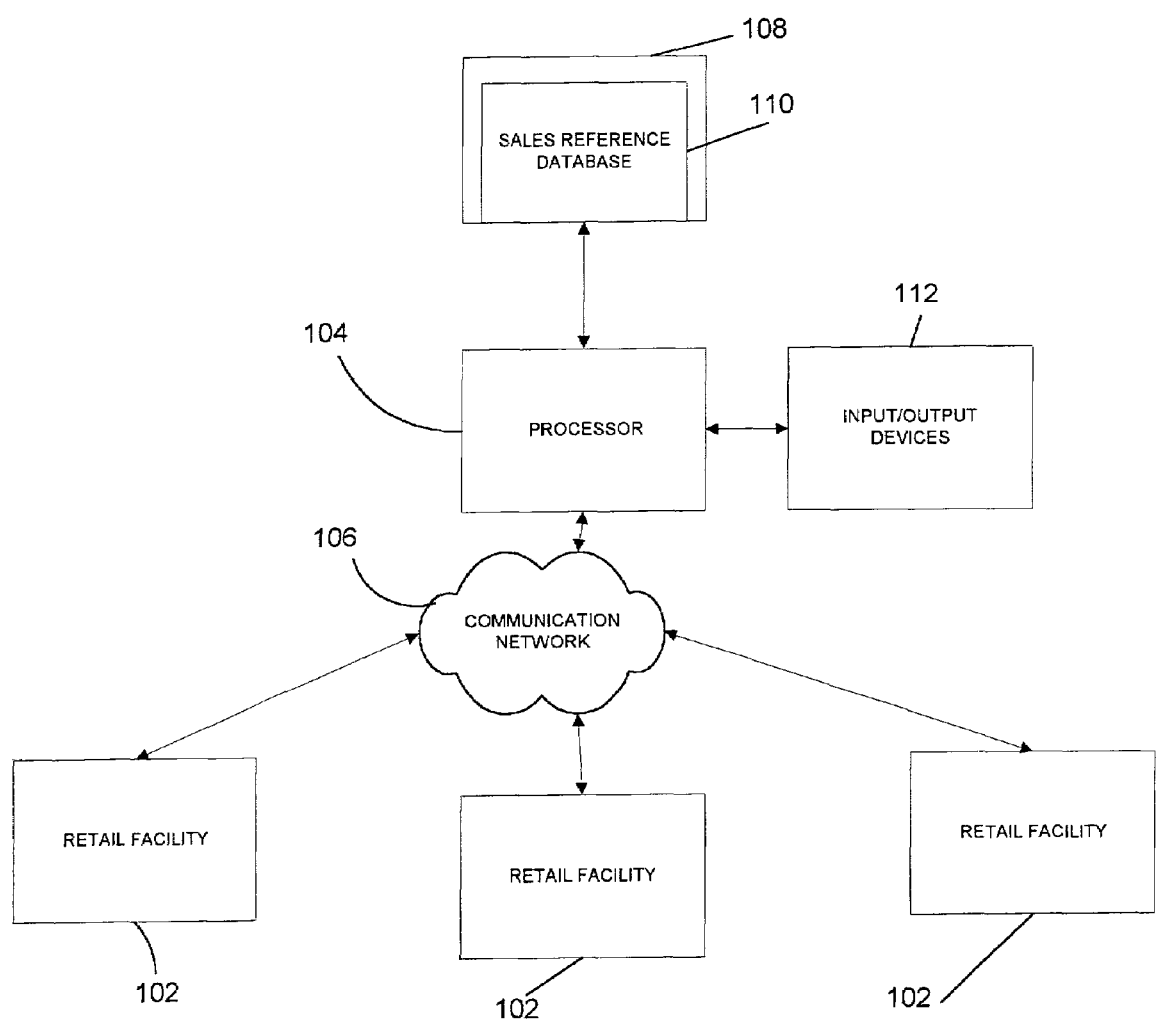
FIG. 1 is a block diagram of a system for performing daily sales volume estimation in accordance with the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

In the present method, an improved estimation of daily sales volume of a product is determined by taking a small sampling of current daily sales of the product and weighting this sampling using a larger pool of sales history data. In addition, weighting utilizes product and/or market specific relationships.

FIG. 1 is a block diagram illustrating an overview of a system in accordance with the present invention. In the system, a number of retail facilities 102 are coupled to a processor 104 via a communication network 106, such as the Internet. While only three retail facilities 102 are shown, it will be appreciated that an actual system may include thousands of such facilities. Further, the processor 104 can also be distributed to service geographic regions or other subsets of the total number of retail facilities 102, if this is desired.

The retail facilities 102 generally use conventional point-of-sale computer systems (not shown) that provide some level of automated data capture for sales information. Regardless of how the sales data are captured, data reflecting sales volume of one or more products is transferred from the retail facility 102 to the processor 104. The processor 104 is connected to a large capacity computer data storage system 108 where the sales data are stored in a sales reference database 110. In addition, the system will generally include various input and output devices 112, such as keyboards, digital pointers (e.g., mouse), video displays, printers and the like which are associated with conventional computer systems to provide user interaction with the system.

The data that are provided from the retail facilities 102 can have various levels of detail. For example, the data can be provided as complete transaction data providing full details of each transaction, or they can be some level of summary, such as daily volume totals provided over a one week period. Typically, the data are provided to the central processor 104 with some degree of time latency (e.g., a one week delay). This form of data collection is already in use in the pharmaceutical industry and such data are used to generate the National Prescription Audit weekly estimate of prescription drug sales volume which is provided by IMS Health Incorporated.

Figure 2:
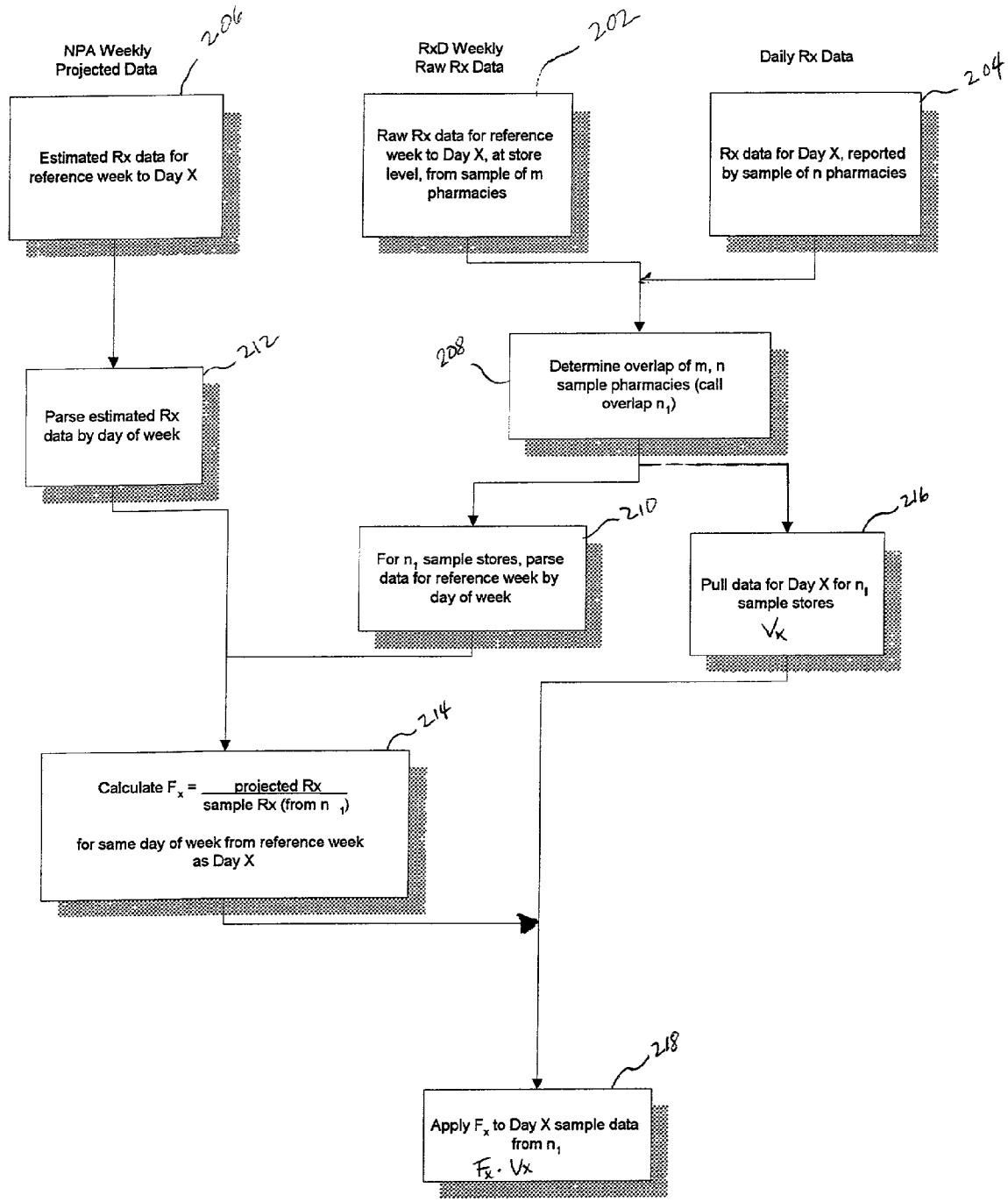
FIG. 2 is a flow chart illustrating a present method of estimating daily sales of a product in accordance with the present invention.

FIG. 2 is a flow chart illustrating a present method of estimating daily sales of a product in accordance with the present invention. Referring to FIG. 2, actual sampled data, or raw data, are received from retailers in two forms. A large number (M) of retail facilities 102 provide raw sales data on a periodic reporting basis 202. These data are usually provided at least weekly with a delay of a several days or more in the data being reported. For example, a retail facility 102 may report sales data on Oct. 10, 2000 for the period including October 1-7. To insure that data is available from a large sampling of retail facilities before the date is used, the weekly data selected for evaluation is generally to have a predetermined offset from the day of interest (X), such as two weeks. For example, if sales projections were desired for Oct. 14, 2000 and the reference week was set to have a two week offset from the day of interest, the reference week would include the period from Oct. 1-7, 2000. The offset between the day of interest and the reference week can be a variable which is selected based on the reporting habits of a large number of the retail facilities 102.

The data provided should have sufficient detail such that daily sales volume for the reporting period can be determined. From the weekly reporting data, weekly projected sales volume estimate data are calculated in a known manner (step 206), such as by scaling the sampled data by the ratio of the number of pharmacies reporting data to the known total number of pharmacies. The weekly projected sales volume data are established for the reference week which has a predetermined delay with respect to the day of interest (X).

In addition to the weekly reporting data from step 202, a smaller number (n) of retail facilities 102 provide sales volume data to the processor 104 in near real-time, such as on a daily basis at the close of each business day (step 204). It is desirable to determine which of those n retail facilities providing daily reporting data for the day of interest (X) have also provided weekly reporting data for the reference week with respect to that day. This intersection of M, n provides a subset (n1) of retail facilities 102 whose data can be used to provide an accurate daily estimation of sales (step 208).

The actual sample data (raw data) from the n1 retail facilities for the reference week are then parsed by day of the week (step 210). Similarly, the projected weekly sales data are also parsed by the day of the week (step 212). From the parsed data, a projection factor, $F_x$, for the day of interest (X) are then calculated in step 214. Referring to step 214, the particular day of the week (i.e., Monday, Tuesday, Wednesday, Thursday, Friday, Saturday, or Sunday) for the current day of interest is determined and data from the same day of the week as day X is selected from both the weekly projected and weekly sampled data. The ratio to the projected data to the raw data for the selected day from the reference week is a projection factor for day X. For example, if the day of interest (X) is Friday, Oct. 13, 2000, the raw data and projected data for Friday, Oct. 6, 2000 would be suitable for providing the Friday-specific projection factor, Fx.

Returning to step 208, the data for day X that were provided by the n1 daily reporting retail facilities are extracted from the sales reference database 110 to determine an aggregate daily reported sales volume ($V_x$) (step 216). This daily sales volume for day X ($V_x$) is then scaled by the projection factor for day X ($F_x$) to arrive at the daily estimated volume for that product (step 218).

By parsing the data from the reference week to arrive at day of the week specific projection factors, and by utilizing data specific to a product or market, a more accurate estimation can be arrived at for a given product. For example, it may be a trend in one industry that sales of a product are particularly high on Mondays and ramp down as the week progresses. Another industry may have an opposite trend or no cognizable trend at all. By using a day of the week specific projection factor, such trend information is captured and reflected in the resulting estimate of daily sales volume.

In addition, the present system and method provides a more accurate and refined estimation of daily sales volume in that it employs both a large sampling of history data from the reference week and near real-time raw data for the day of interest. Such a method is particularly valuable when the past history data are insufficient to accurately project daily sales, such as during a new product rollout. The method is also suitable to determine the effectiveness of new promotional activities which may render the existing history data somewhat inapplicable.

Although the present invention has been described in connection with specific exemplary embodiments, it should be understood that various changes, substitutions and alterations can be made to the disclosed embodiments without departing from the spirit and scope of the invention as set forth in the appended claims.

What is claimed is:

1. A method for estimating sales volume of an item comprising:
    collecting sampled sales data for a reference period;
    receiving said sampled sales data in a central processor;
    estimating total sales volume for the reference period by a computer program at least partially controlling said central processor;
    parsing the reference period into a plurality of sub-periods;
    collecting sampled sales data for a current sub-period of interest, the current sub-period of interest and collection of sampled sales data being later in time than the reference period;
    matching the current sub-period to a corresponding sub-period from said plurality of sub-periods;
    calculating a sub-period specific projection factor for the corresponding sub-period; and
    applying said projection factor to said sales data from the current sub-period of interest to determine an estimate of total sales for the current sub-period.

2. The method for estimating sales volume of claim 1, wherein the sub-periods are days of the week.

3. The method for estimating sales volume of claim 1, wherein the reference period is one week.

4. The method for estimating sales volume of claim 3, wherein the current sub-period is a certain day of the week, the sub-periods of the reference period are days of the week and wherein the corresponding sub-period is the day of the week matching the certain day.

5. The method for estimating sales volume of claim 4, wherein the item is a pharmaceutical product.

6. The method for estimating sales volume of claim 1, wherein the sample size for the reference period is larger than the sample size for the current sub-period of interest.

7. A method for estimating daily sales volume of an item comprising:
    collecting sampled sales data from a first plurality of sources for a current day of interest;
    collecting sampled sales data for a reference week from a second plurality of sources, said reference week being offset in time from said current day by a predetermined time period;
    receiving said sampled sales data in a central processor;
    estimating total sales volume for the reference week by a computer program at least partially controlling said central processor;

parsing the sampled sales data and estimated total sales volume for the reference week by day of the week;

selecting the parsed sales data and estimated total sales volume data for the day of the week in the reference week that matches the day of the week of the current day of interest;

calculating a day of the week specific projection factor for the current day of interest; and applying said projection factor to said sales data for the current day of interest to determine an estimate of total sales for the day of interest.

8. The method for estimating sales volume of claim 7, wherein the quantity of sampled sales data for the current day of interest is smaller than the quantity of sampled sales data for the corresponding day of the week in the reference week.

9. The method for estimating sales volume of claim 7, further comprising the step of comparing said first plurality of sources to said second plurality of sources to determine the intersection of said sources and wherein the step of determining the day of the week specific projection factor applies sample data from said intersection of sources.

10. The method for estimating sales volume of claim 9, wherein the sources are retail pharmacies.

11. The method for estimating sales volume of claim 10, wherein the item is a pharmaceutical product.

12. A system for estimating sales volume of an item comprising:

a processor having a communications interface for coupling to a communications network to receive sales data from a plurality of retail points of sale;

a data storage device coupled to said processor, said computer data device storing sales data from a plurality of retail points of sale, including sampled sales data for a reference period and sampled sales data for a day of interest, said day of interest and collection of sampled sales data being later in time than said reference period;

a computer program at least partially controlling said processor to retrieve the sampled data for the reference period from said data storage device, to generate estimated total volume data for the reference period from said sampled data for the reference period, to generate a day of the week specific projection factor related to said day of interest from said estimated total sales volume data and sampled data for the reference period, and to apply the projection factor to the sampled data for the day of interest to estimate total daily sales volume for the day of interest.

13. The system for estimating sales volume according to claim 12, wherein the sampled data in said data storage device includes an indication of the retail point of sale source and wherein the sampled data for the reference period is provided from a first plurality of sources and the sampled data for the day of interest is provided from a second plurality of sources, and said computer program directs the processor to determine the intersection of the first and second sources and to apply the data from said intersection to determine said projection factor.

14. The system for estimating sales volume according to claim 13, wherein the sales data relates to pharmaceutical sales.

* * * * *